United States Patent
Kim et al.

(10) Patent No.: US 11,192,441 B1
(45) Date of Patent: Dec. 7, 2021

(54) POWERTRAIN FOR HYBRID VEHICLE

(71) Applicants: Hyundai Motor Company, Seoul (KR); Kia Motors Corporation, Seoul (KR)

(72) Inventors: Hyung Min Kim, Suwon-si (KR); Bong Hyun Cho, Gunpo-si (KR); Jae Young Jeon, Osan-si (KR); Byung Dae Choi, Seoul (KR); Jin Yong Kim, Incheon (KR); Hyu Tae Shim, Hwaseong-si (KR); Gwang Soo Hwang, Hwaseong-si (KR); Jun Seong Kang, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/029,847

(22) Filed: Sep. 23, 2020

(30) Foreign Application Priority Data

Jun. 8, 2020 (KR) .......................... 10-2020-0069185

(51) Int. Cl.
| | |
|---|---|
| *B60K 6/365* | (2007.10) |
| *B60K 6/26* | (2007.10) |
| *B60K 6/38* | (2007.10) |
| *B60K 6/405* | (2007.10) |
| *F16H 3/66* | (2006.01) |
| *B60K 6/24* | (2007.10) |
| *B60K 6/543* | (2007.10) |

(52) U.S. Cl.
CPC .............. *B60K 6/365* (2013.01); *B60K 6/24* (2013.01); *B60K 6/26* (2013.01); *B60K 6/38* (2013.01); *B60K 6/405* (2013.01); *F16H 3/663* (2013.01); *B60K 6/543* (2013.01); *B60K 2006/262* (2013.01); *B60K 2006/381* (2013.01); *B60Y 2200/92* (2013.01); *B60Y 2304/05* (2013.01); *B60Y 2400/732* (2013.01); *F16H 2200/0052* (2013.01); *F16H 2200/2025* (2013.01); *F16H 2200/2041* (2013.01)

(58) Field of Classification Search
None
See application file for complete search history.

(56) References Cited

U.S. PATENT DOCUMENTS

| | | | |
|---|---|---|---|
| 10,889,175 B1* | 1/2021 | Hwang | ............... F16H 3/666 |
| 2020/0180421 A1* | 6/2020 | Dempel | ................ B60K 6/365 |

FOREIGN PATENT DOCUMENTS

| | | | |
|---|---|---|---|
| DE | 102016223108 B3 * | 12/2017 | ............... B60K 6/48 |
| KR | 10-2009-0132758 A | 12/2009 | |

* cited by examiner

*Primary Examiner* — Dirk Wright
(74) *Attorney, Agent, or Firm* — Morgan, Lewis & Bockius LLP

(57) ABSTRACT

A powertrain for a hybrid vehicle may include a planetary gear set including five rotation elements, an input shaft connected to an engine and configured to be selectively connectable to a first rotation element and to a fourth rotation element of the planetary gear set, a motor generator connected to a second rotation element of the planetary gear set, an output shaft connected to a third rotation element of the planetary gear set, and a brake configured to selectively fix the fifth rotation element of the planetary gear set to a transmission housing.

13 Claims, 4 Drawing Sheets

FIG. 3

| CLASSIFICATION | | WORKING ELEMENT | | | |
|---|---|---|---|---|---|
| | | CL1 | CL2 | CL3 | B1 |
| EV MODE | 4$^{TH}$ | | | O | |
| | R | | | | O |
| | 1$^{ST}$ | | | | O |
| ENGINE MODE (HYBRID MODE) | 2$^{ND}$ | O | | | O |
| | 3$^{RD}$ | | O | | O |
| | 4$^{TH}$ | O | O | | |
| E-CVT MODE | 5$^{TH}$ | | O | | |
| | 6$^{TH}$ | O | | | |
| STOP-AND-CHARGE MODE | 1 | O | | | |
| | 2 | | O | | |

POWERTRAIN FOR HYBRID VEHICLE

CROSS-REFERENCE TO RELATED APPLICATION

The present application claims priority to Korean Patent Application No. 10-2020-0069185, filed on Jun. 8, 2020 in the Korean Intellectual Property Office, the entire contents of which is incorporated herein for all purposes by this reference.

BACKGROUND OF THE INVENTION

Field of the Invention

The present invention relates to a powertrain structure for a hybrid vehicle.

Description of Related Art

A hybrid vehicle is provided with a powertrain that appropriately combines power from an engine with power from an electric motor, improving fuel efficiency while achieving power performance required for the vehicle.

It is preferable for the powertrain for a hybrid vehicle to have as few components as possible and a simple structure, to realize as many gear stages as possible, and to achieve power performance required for the vehicle while improving the fuel efficiency of an engine.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a hybrid vehicle, which has as few components as possible and a simple structure, is less costly to produce, is easy to mount to a vehicle, realizes as many gear stages as possible, and thus sufficiently achieves power performance required for the vehicle while improving the fuel efficiency of an engine.

In accordance with an aspect of the present invention, the above and other objects may be accomplished by the provision of a powertrain for a hybrid vehicle, including a planetary gear set including five rotation elements, an input shaft connected to an engine and configured to be selectively connectable to a first rotation element and to a fourth rotation element of the planetary gear set, a motor generator connected to a second rotation element of the planetary gear set, an output shaft connected to a third rotation element of the planetary gear set, and a brake configured to selectively fix the fifth rotation element of the planetary gear set to a transmission housing.

In the planetary gear set, the first rotation element may be configured as a first sun gear, the second rotation element may be configured as a second sun gear, the third rotation element may be configured as a common carrier, the fourth rotation element may be configured as a first ring gear, and the fifth rotation element may be configured as a second ring gear.

The input shaft may be connected to the first sun gear of the planetary gear set via a first clutch, and may be connected to the first ring gear of the planetary gear set via a second clutch.

The motor generator may be selectively connectable to the first sun gear of the planetary gear set via a third clutch.

In accordance with another aspect of the present invention, there is a provided a powertrain for a hybrid vehicle, including a first rotation shaft connected to an engine, a second rotation shaft connected to a first rotation element of a planetary gear set, a third rotation shaft connecting a second rotation element of the planetary gear set to a motor generator, a fourth rotation shaft provided as an output shaft connected to a third rotation element of the planetary gear set, a fifth rotation shaft connected to a fourth rotation element of the planetary gear set, a sixth rotation shaft connected to a fifth rotation element of the planetary gear set, a first clutch provided to connect or disconnect the first rotation shaft and the second rotation shaft to or from each other, a second clutch provided to connect or disconnect the first rotation shaft and the fifth rotation shaft to or from each other, and a brake provided to selectively fix the sixth rotation shaft to a transmission housing.

The powertrain may further include a third clutch provided to connect or disconnect the second rotation shaft and the third rotation shaft to or from each other.

In the planetary gear set, the first rotation element may be configured as a first sun gear, the second rotation element may be configured as a second sun gear, the third rotation element may be configured as a common carrier, the fourth rotation element may be configured as a first ring gear, and the fifth rotation element may be configured as a second ring gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operation mode table of the various exemplary embodiments of the present invention.

Figure 1:
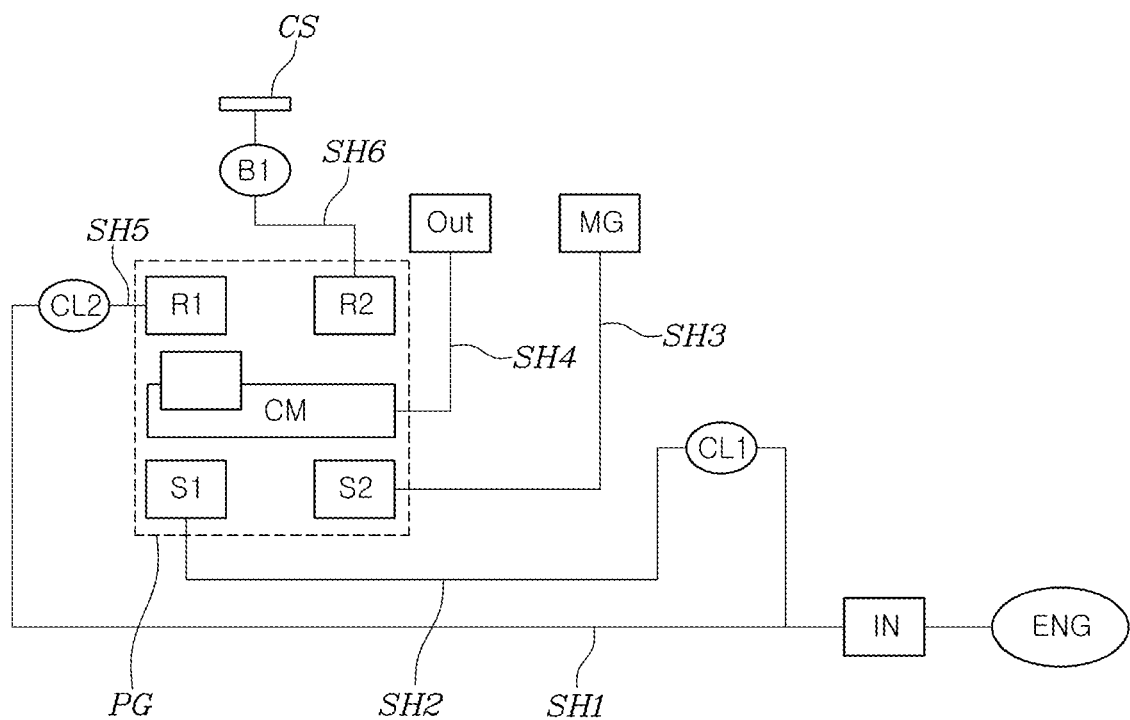
FIG. 1 is a diagram showing the configuration of a powertrain for a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims Reference will now be made in detail to the exemplary embodiments of the present invention, examples of which are illustrated in the accompanying drawings.

Figure 2:
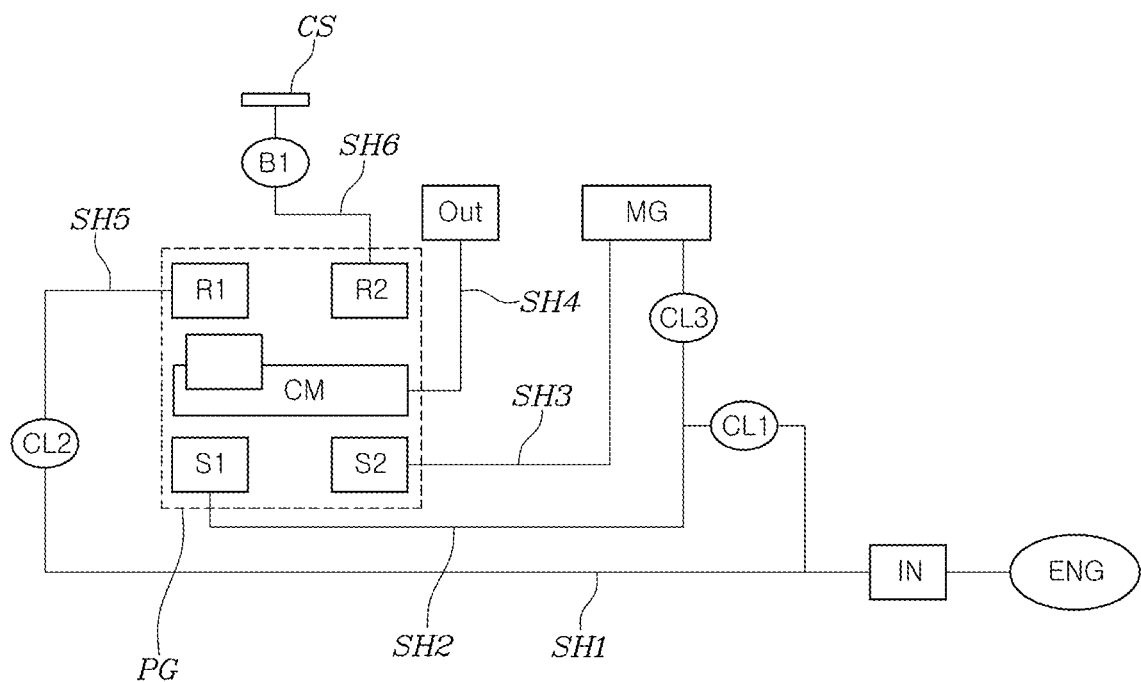
FIG. 2 is a diagram showing the configuration of a powertrain for a hybrid vehicle according to various exemplary embodiments of the present invention.

Referring to FIG. 1 and FIG. 2, each of embodiments of a powertrain for a hybrid vehicle according to various exemplary embodiments of the present invention includes a planetary gear set PG including five rotation elements, an input shaft IN connected to an engine and configured to be selectively connectable to a first rotation element and to a fourth rotation element of the planetary gear set PG, a motor generator MG connected to a second rotation element of the planetary gear set PG, an output shaft OUT connected to a third rotation element of the planetary gear set PG, and a brake B1 configured to fix a fifth rotation element of the planetary gear set PG to a transmission housing CS.

According to various exemplary embodiments of the present invention, the planetary gear set PG, as shown in the drawings, is configured as a Ravigneaux-type planetary gear set PG.

In the planetary gear set PG, the first rotation element is configured as a first sun gear S1, the second rotation element is configured as a second sun gear S2, the third rotation element is configured as a common carrier CM, the fourth rotation element is configured as a first ring gear R1, and the fifth rotation element is configured as a second ring gear R2.

The input shaft IN is connected to the first sun gear S1 of the planetary gear set PG via a first clutch CL1, and is connected to the first ring gear R1 of the planetary gear set PG via a second clutch CL2.

Thus, the input shaft IN receives power from the engine and transmits the power from the engine to the first sun gear S1 in the engaged state of the first clutch CL1, or transmits the power from the engine to the first ring gear R1 in the engaged state of the second clutch CL2.

Compared to the various exemplary embodiments shown in FIG. 1, the various exemplary embodiments shown in FIG. 2 further includes a third clutch CL3. The motor generator MG is configured to be selectively connectable to the first sun gear S1 of the planetary gear set PG via the third clutch CL3.

Thus, in the engaged state of the third clutch CL3, the first sun gear S1 and the second sun gear S2 are operated in a manner which is interlocked with the operation of the motor generator MG.

The brake B1 is provided to fix or release the second ring gear R2 to or from a transmission housing CS.

The exemplary embodiments of the present invention may also be referred to as follows.

Each of the exemplary embodiments of the powertrain for a hybrid vehicle according to various exemplary embodiments of the present invention includes a first rotation shaft SH1, which is an input shaft IN connected to an engine ENG, a second rotation shaft SH2 connected to a first rotation element of a planetary gear set PG, a third rotation shaft SH3 connecting a second rotation element of the planetary gear set PG to a motor generator MG, a fourth rotation shaft SH4, which is an output shaft OUT connected to a third rotation element of the planetary gear set PG, a fifth rotation shaft SH5 connected to a fourth rotation element of the planetary gear set PG, a sixth rotation shaft SH6 connected to a fifth rotation element of the planetary gear set PG, a first clutch CL1 provided to connect or disconnect the first rotation shaft SH1 and the second rotation shaft SH2 to or from each other, a second clutch CL2 provided to connect or disconnect the first rotation shaft SH1 and the fifth rotation shaft SH5 to or from each other, and a brake B1 provided to connect the sixth rotation shaft SH6 to a transmission housing CS.

Compared to the various exemplary embodiments of the present invention in FIG. 1, the various exemplary embodiments further in FIG. 2 include a third clutch CL3 provided to connect or disconnect the second rotation shaft SH2 and the third rotation shaft SH3 to or from each other.

As may be seen in the operation mode table of FIG. 3, the powertrain for a hybrid vehicle according to various exemplary embodiments of the present invention configured as described above realizes the first gear stage, the fourth gear stage, and the reverse gear stage (R-range) in an electric vehicle (EV) mode, realizes the second gear stage, the third gear stage, and the fourth gear stage in an engine mode, in which only the power from the engine is used, or in a hybrid mode, in which the power from the motor is combined with the power from the engine, enables a continuous change of the shift ratio between the fifth gear stage shift ratio and the sixth gear stage shift ratio in an electric continuously variable transmission (E-CVT) mode, which is a type of hybrid mode which is configured for achieving a continuous change of the shift ratio by controlling the motor generator MG in the state in which the power from the engine is input, and realizes two stop-and-charge modes, in which charging is performed by driving the motor generator MG using the power from the engine when the vehicle is stopped.

In the fourth gear stage in the engine mode (or the hybrid mode), in which both the first clutch CL1 and the second clutch CL2 are in the engaged state, or in the fourth gear stage in the EV mode, in which the third clutch CL3 is in the engaged state, all of the rotation elements of the planetary gear set PG are integrated to realize a shift ratio of 1:1. In the instant state, regenerative power generation is performed by the motor generator MG.

Figure 4:
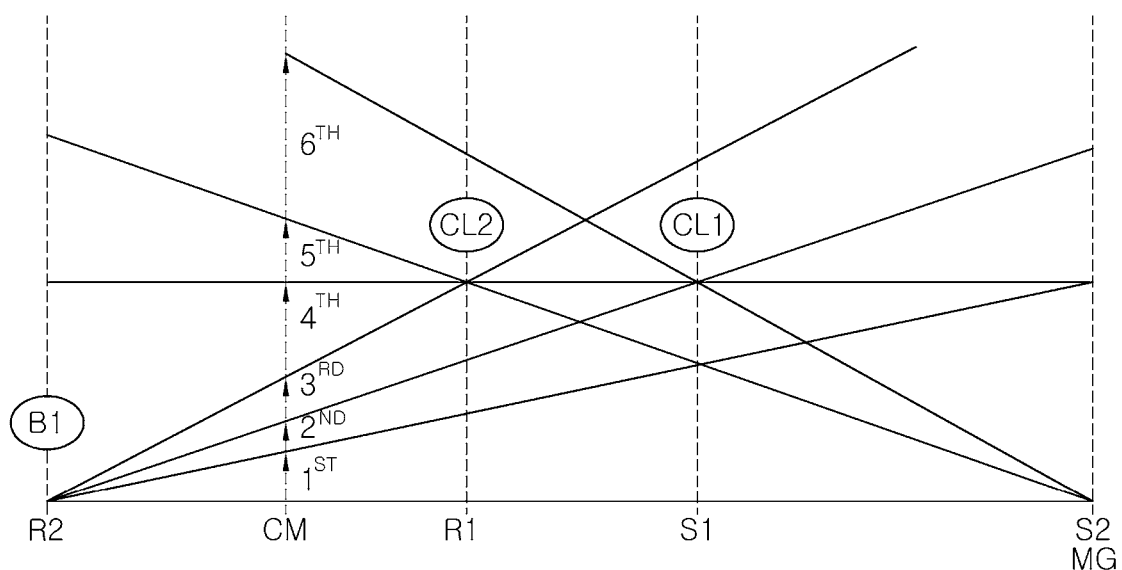
FIG. 4 is a speed diagram of the powertrain according to various exemplary embodiments of the present invention.

FIG. 4 is a speed diagram showing the gear stages realized by the powertrain according to various exemplary embodiments of the present invention described above.

As described above, the present invention has a relatively simple configuration, is less costly to produce, and is easily applied to a front-wheel-drive vehicle due to the ease with which the same is provided to a vehicle. Furthermore, the present invention is configured for realizing one reverse gear stage and six forward gear stages, easily achieving power performance required for the vehicle. Furthermore, the present invention is configured for continuously changing an overdrive shift ratio of the fifth gear stage or the sixth gear stage, thereby improving fuel efficiency, when the vehicle is traveling at a high speed.

As is apparent from the above description, various aspects of the present invention are directed to providing a powertrain for a hybrid vehicle, which has as few components as possible and a simple structure, is less costly to produce, is easy to mount to a vehicle, realizes as many gear stages as possible, and thus sufficiently achieves power performance required for the vehicle while improving the fuel efficiency of an engine.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus for a vehicle, the powertrain apparatus comprising:
    a planetary gear set including a first rotation element, a second rotation element, a third rotation element, a fourth rotation element and a fifth rotation element;
    an input shaft connected to a power source and being selectively connectable to either or both of the first rotation element and the fourth rotation element of the planetary gear set;
    a motor generator connected to the second rotation element of the planetary gear set;
    an output shaft fixedly connected to the third rotation element of the planetary gear set;
    a brake configured to selectively fix the fifth rotation element of the planetary gear set to a transmission housing; and
    a third clutch, wherein the motor generator is selectively connectable to the first rotation element of the planetary gear set via the third clutch.

2. The powertrain apparatus according to claim 1, wherein the power source is an engine.

3. The powertrain apparatus according to claim 1, further includes:
    a first clutch and a second clutch,
    wherein the input shaft is selectively connectable to the first rotation element of the planetary gear set via the first clutch, and
    wherein the input shaft is selectively connectable to the fourth rotation element of the planetary gear set via the second clutch.

4. A powertrain apparatus for a vehicle, the powertrain apparatus comprising:
    a planetary gear set including a first rotation element, a second rotation element, a third rotation element, a fourth rotation element and a fifth rotation element;
    an input shaft connected to a power source and being selectively connectable to either or both of the first rotation element and the fourth rotation element of the planetary gear set;
    a motor generator connected to the second rotation element of the planetary gear set;
    an output shaft fixedly connected to the third rotation element of the planetary gear set; and
    a brake configured to selectively fix the fifth rotation element of the planetary gear set to a transmission housing,
    wherein, in the planetary gear set, the first rotation element is a first sun gear, the second rotation element is a second sun gear, the third rotation element is a common carrier, the fourth rotation element is a first ring gear, and the fifth rotation element is a second ring gear.

5. The powertrain apparatus according to claim 4, further includes:
    a first clutch and a second clutch,
    wherein the input shaft is selectively connectable to the first sun gear of the planetary gear set via the first clutch, and
    wherein the input shaft is selectively connectable to the first ring gear of the planetary gear set via the second clutch.

6. The powertrain apparatus according to claim 5, further including a third clutch, wherein the motor generator is selectively connectable to the first sun gear of the planetary gear set via the third clutch.

7. The powertrain apparatus according to claim 4, further including a third clutch, wherein the motor generator is selectively connectable to the first sun gear of the planetary gear set via the third clutch.

8. A powertrain apparatus for a vehicle, the powertrain apparatus comprising:
    a planetary gear set including a first rotation element, a second rotation element, a third rotation element, a fourth rotation element and a fifth rotation element;
    a first rotation shaft connected to a power source;
    a second rotation shaft fixedly connected to the first rotation element of the planetary gear set;
    a third rotation shaft connecting the second rotation element of the planetary gear set to a motor generator;
    a fourth rotation shaft fixedly connected to the third rotation element of the planetary gear set and provided as an output shaft;
    a fifth rotation shaft fixedly connected to the fourth rotation element of the planetary gear set;
    a sixth rotation shaft fixedly connected to the fifth rotation element of the planetary gear set;
    a first clutch provided to selectively connect the first rotation shaft to the second rotation shaft;
    a second clutch provided to selectively connect the first rotation shaft to the fifth rotation shaft; and
    a brake provided to selectively fix the sixth rotation shaft to a transmission housing,
    wherein, in the planetary gear set, the first rotation element is a first sun gear, the second rotation element is a second sun gear, the third rotation element is a common carrier, the fourth rotation element is a first ring gear, and the fifth rotation element is a second ring gear.

9. The powertrain apparatus according to claim 8, wherein the power source is an engine.

10. The powertrain apparatus according to claim 8, further including:

a third clutch provided to selectively connect the second rotation shaft to the third rotation shaft.

11. The powertrain apparatus according to claim 8, further including:

a third clutch provided to selectively connect the second rotation shaft to the motor generator.

12. The powertrain apparatus according to claim 8, wherein the planetary gear set is a Ravigneaux planetary gear set.

13. The powertrain apparatus according to claim 4, wherein the planetary gear set is a Ravigneaux planetary gear set.

* * * * *